(12) United States Patent
Hashimoto

(10) Patent No.: US 6,781,258 B2
(45) Date of Patent: Aug. 24, 2004

(54) COOLING DEVICE OF ELECTRONIC APPARATUS

(75) Inventor: Eiji Hashimoto, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 09/954,038

(22) Filed: Sep. 18, 2001

(65) Prior Publication Data

US 2002/0079746 A1 Jun. 27, 2002

(30) Foreign Application Priority Data

Dec. 22, 2000 (JP) ........................................ 2000-390963

(51) Int. Cl.⁷ ................................................ H02J 1/00
(52) U.S. Cl. ............................ 307/87; 307/85; 307/130; 307/140; 361/696
(58) Field of Search ............................ 307/85, 87, 130, 307/140, 149, 116, 117; 361/696

(56) References Cited

U.S. PATENT DOCUMENTS

| | | | | |
|---|---|---|---|---|
| 4,763,347 A | * | 8/1988 | Erdman | 318/254 |
| 5,796,580 A | | 8/1998 | Komatsu et al. | |
| 6,259,172 B1 | * | 7/2001 | Lee | 307/125 |
| 6,407,672 B1 | * | 6/2002 | Grenz et al. | 340/635 |
| 6,494,381 B2 | * | 12/2002 | Bulthuis | 236/49.3 |

FOREIGN PATENT DOCUMENTS

| | | |
|---|---|---|
| JP | 01-301998 | 12/1989 |
| JP | 03-036448 | 2/1991 |
| JP | 03-207977 | 9/1991 |
| JP | 05-190329 | 7/1993 |
| JP | 08-234848 | 9/1996 |

\* cited by examiner

Primary Examiner—Robert DeBeradinis
(74) Attorney, Agent, or Firm—Finnegan, Henderson, Farabow, Garrett & Dunner, L.L.P.

(57) ABSTRACT

A control device of a cooling device controls a fan based on a desired temperature around a CPU set by a target value setting unit and a temperature detected by a temperature detecting unit, so that the temperature around the CPU substantially coincides with the set desired temperature. When the detected temperature exceeds the desired temperature, the control device causes the fan to rotate. At this time, the control device monitors the level of a noise generated by the fan by means of the noise detecting unit. The control device increases the value of the voltage supplied to the fan within a range in which the detected noise does not vary abruptly. As a result, the rotation speed is gradually increased to a predetermined value without causing an abrupt rise of a noise, which may acutely irritate the user.

2 Claims, 4 Drawing Sheets

COOLING DEVICE OF ELECTRONIC APPARATUS

CROSS-REFERENCE TO RELATED APPLICATIONS

This application is based upon and claims the benefit of priority from the prior Japanese Patent Application No. 2000-390963 filed Dec. 22, 2000, the entire contents of which are incorporated herein by reference.

BACKGROUND OF THE INVENTION

1. Field of the Invention

The present invention relates to a cooling device of electronic apparatus applicable to, for example, a personal computer, and particularly to a cooling device of electronic apparatus in which a noise generated by a cooling fan does not discomfort the user.

2. Description of the Related Art

In recent years, various types of electronic apparatus incorporating a CPU have been developed. As the performance of the CPU is improved, the latest electronic apparatus includes a cooling device to make full use of the performances of the CPU. Most of the cooling devices incorporated in this type of electronic apparatus adopt a so-called air-cooled system that lowers the temperature by rotating a cooling fan.

In the conventional cooling device utilizing the air-cooled system, in general, a desired temperature around the CPU is set by a target value setting unit. On the other hand, the temperature in a housing, which varies from moment to moment due to external perturbations, such as heat of the CPU, is detected by a temperature detecting unit. A control device controls the fan based on the desired temperature around the CPU set by the target value setting unit and the temperature detected by the temperature detecting unit. By the control of the control device, the temperature around the CPU is kept substantially the same as the set desired temperature around the CPU.

More specifically, for example, when the temperature detected by the temperature detecting unit is higher than the desired temperature around the CPU set by the target value setting unit, the fan is rotated at a predetermined rotation speed. When the detected temperature is lower than the desired temperature set by the target value setting unit, the fan is stopped in order to save power.

Conventionally, when the temperature around the CPU is higher than the desired temperature, the fan is immediately rotated at a predetermined speed from standstill. Thus, the fan, which has been completely silent, abruptly produces a noise.

This abrupt noise can acutely irritate the user. Thus, the fan necessary to make full use of the performances of the CPU discomforts the user.

BRIEF SUMMARY OF THE INVENTION

An object of the present invention is to provide a cooling device of electronic apparatus in which a noise generated by a cooling fan does not discomfort the user.

To achieve the above object, the present invention may provide a cooling device of electronic apparatus comprising: a temperature sensor; a cooling fan; a noise detecting unit configured to detect a sound pressure of a noise generated by the cooling fan; and a fan control unit configured to control a rotation speed of the cooling fan based on a detection result of the temperature sensor and a detection result of the noise detecting unit.

In the above cooling device of electronic apparatus of the present invention, the cooling fan is controlled to increase the rotation speed gradually, so as not to cause a sudden rise of a noise that may acutely irritate the user. As a result, the noise generated by the cooling fan does not substantially discomfort the user.

When the temperature around the CPU is lower than the desired temperature, the cooling fan is controlled to decrease the rotation speed gradually. Consequently, the sudden fall of a noise that may acutely irritate the user is prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings.

(First Embodiment)

Figure 1:
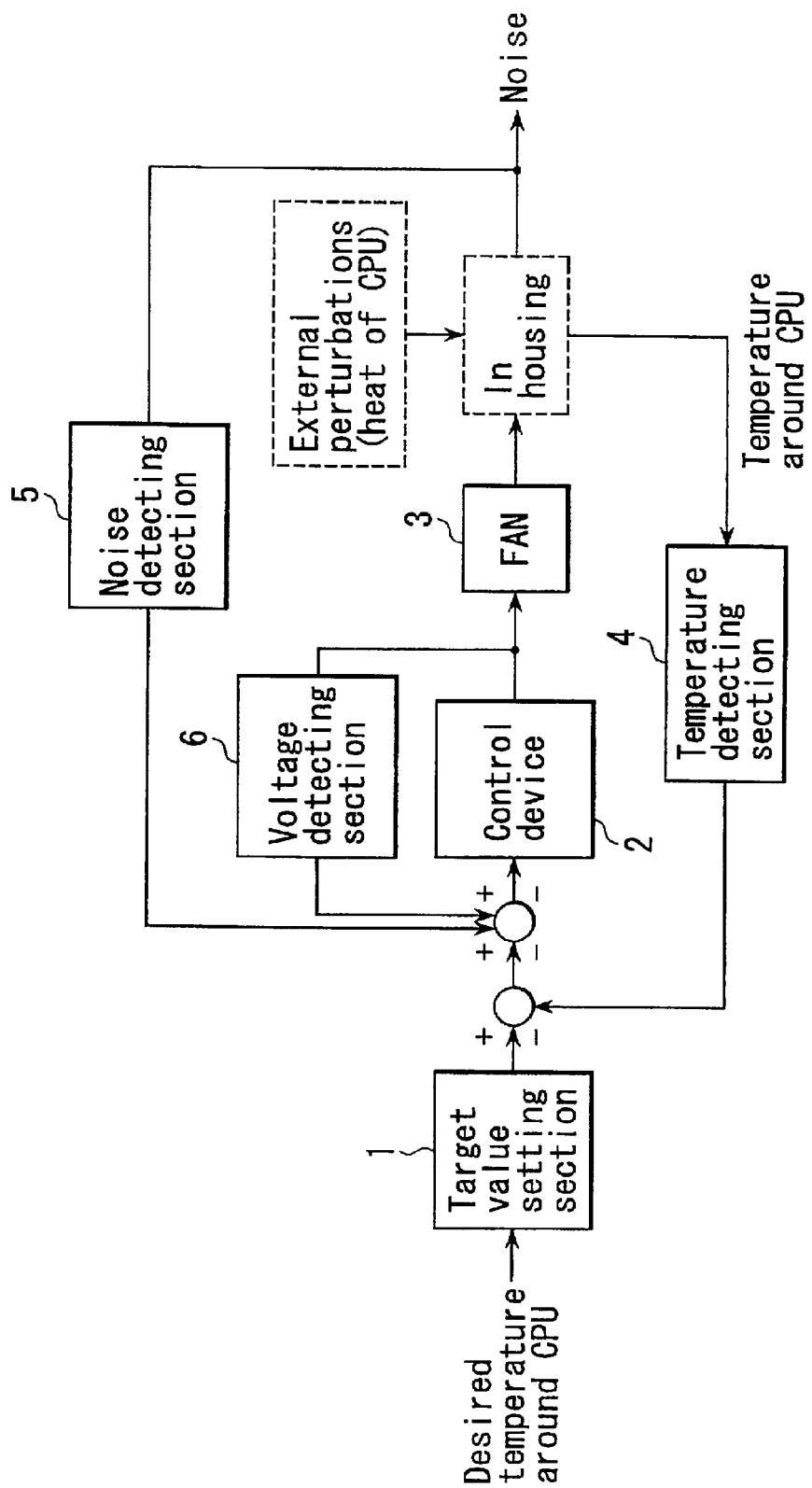
FIG. 1 is a block diagram showing a cooling device according to a first embodiment of the present invention.

FIG. 1 is a block diagram showing a cooling device according to a first embodiment of the present invention.

The cooling device is applicable to electronic apparatus, for example, a personal computer, which incorporates a CPU. As shown in FIG. 1, the cooling device includes a target value setting unit 1, a control device 2, a fan 3 and a temperature detecting unit 4, all of which the conventional cooling device also includes. In addition, the cooling device of this embodiment includes a noise detecting unit 5 and a voltage detecting unit 6.

As in the conventional device, a desired temperature around the CPU is set by the target value setting unit 1 of this cooling device. The temperature in a housing, which varies from moment to moment due to external perturbations, such as heat of the CPU, is detected by the temperature detecting unit 4. Basically, the control device 2 controls the fan 3 based on the desired temperature around the CPU set by the target value setting unit 1 and the temperature detected by the temperature detecting unit 4. By the control of the control device 2, the temperature around the CPU is kept substantially the same as the set desired temperature around the CPU.

More specifically, first, the control device 2 calculates a reference value from the desired temperature around the CPU set by the target value setting unit 1. Thereafter, the control device 2 monitors whether the temperature detected by the temperature detecting unit 4 exceeds the calculated reference value. When the temperature detected by the temperature detecting unit 4 is higher than the reference value, the control device 2 causes the fan 3 to rotate. At this time, the control device 2 monitors the level of noise generated by the fan 3 by means of the noise detecting unit 5.

The noise detecting unit 5 detects a change in sound pressure per unit time. The control device 2 monitors the value of the voltage supplied to the fan 3 by means of the voltage detecting unit 6 and detects the rotation speed at that time. The control device 2 increases the value of the voltage supplied to the fan 3 within a range in which the noise detected by the noise detecting unit 5 does not vary abruptly, thereby increasing the rotation speed to a predetermined value gradually.

To the contrary, when the temperature detected by the temperature detecting unit 4 is lower than the reference value, the control device 2 decreases the value of the voltage supplied to the fan 3 within a range in which the noise detected by the noise detecting unit 5 does not vary abruptly, thereby gradually decreasing the rotation speed until the fan 3 is stopped.

Figure 2:
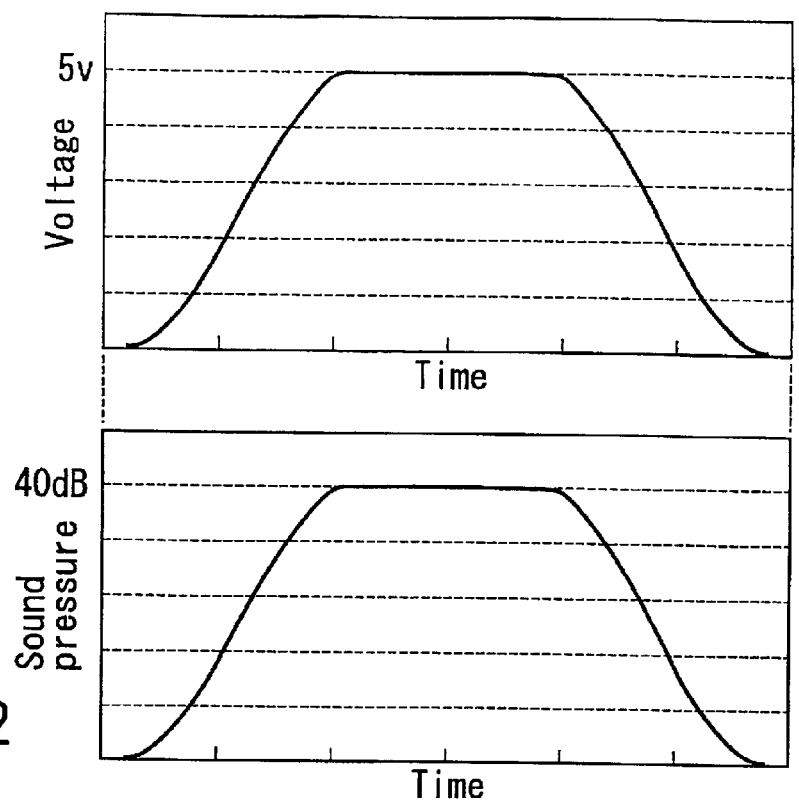
FIG. 2 is a diagram showing a change with time of a sound pressure of a noise generated by a cooling device according to the first embodiment.
Figure 3:
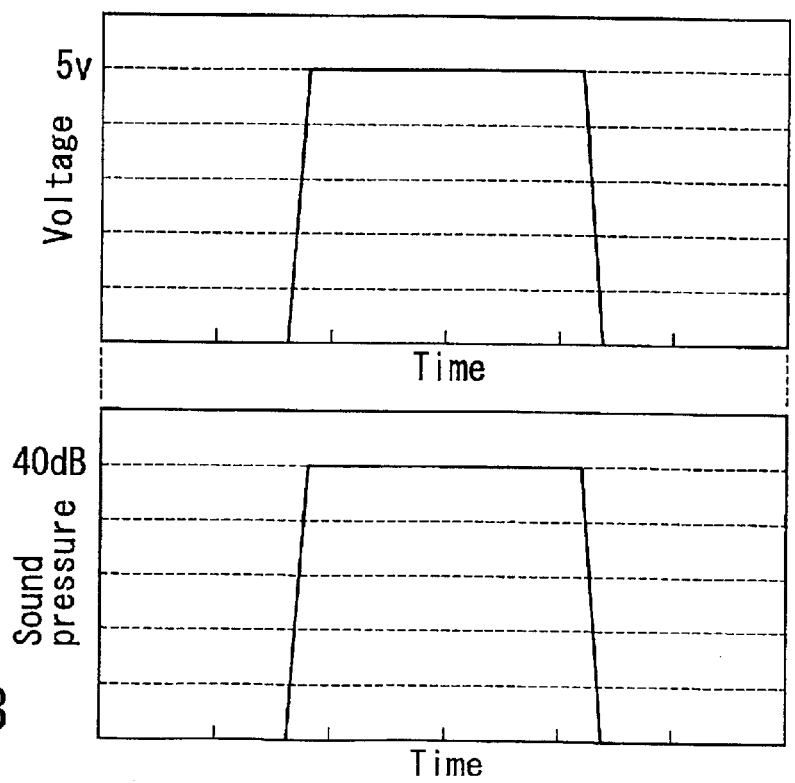
FIG. 3 is a diagram showing a change with time of a sound pressure of a noise generated by a conventional cooling device.

FIG. 2 is a diagram showing a change with time of a sound pressure of a noise generated by the fan 3 of the cooling device. FIG. 3 is a diagram showing a change with time of a sound pressure of a noise generated by the fan of a conventional cooling device. In each diagram, the upper graph shows a change in voltage supplied to the fan, and the lower graph shows a change in sound pressure of a noise generated by the fan 3.

As shown in FIG. 2, with the cooling device of this embodiment, when the control device 2 causes the fan 3 to rotate based on the temperature detected by the temperature detecting unit 4, it controls the fan 3 to gradually increase the rotation speed such that a change in noise is limited within a certain range. In comparison with FIG. 3, it is clear that in this embodiment there is no abrupt rise or fall of a noise, which may acutely irritate the user. As a result, the noise generated by the cooling fan does not substantially discomfort the user.

In this embodiment, the value of the voltage supplied to the fan 3 is increased or decreased in accordance with the detection result of the noise detecting unit 5. However, if the relationship between the noise and the rotation speed of the fan 3, i.e., the value of the voltage supplied to the fan 3, is measured in advance, it is unnecessary to provide the cooling device with the noise detecting unit 5. In this case also, it is possible to prevent an abrupt rise and fall of a noise, which may acutely irritate the user. Thus, if the value of the voltage supplied to the fan 3 is increased or decreased such that the change of the voltage value detected by the voltage detecting unit 6 is limited within a predetermined range, an abrupt rise and fall of a noise, which may acutely grate on the human ears, can be prevented.

(Second Embodiment)

A second embodiment of the present invention will be described.

Figure 4:
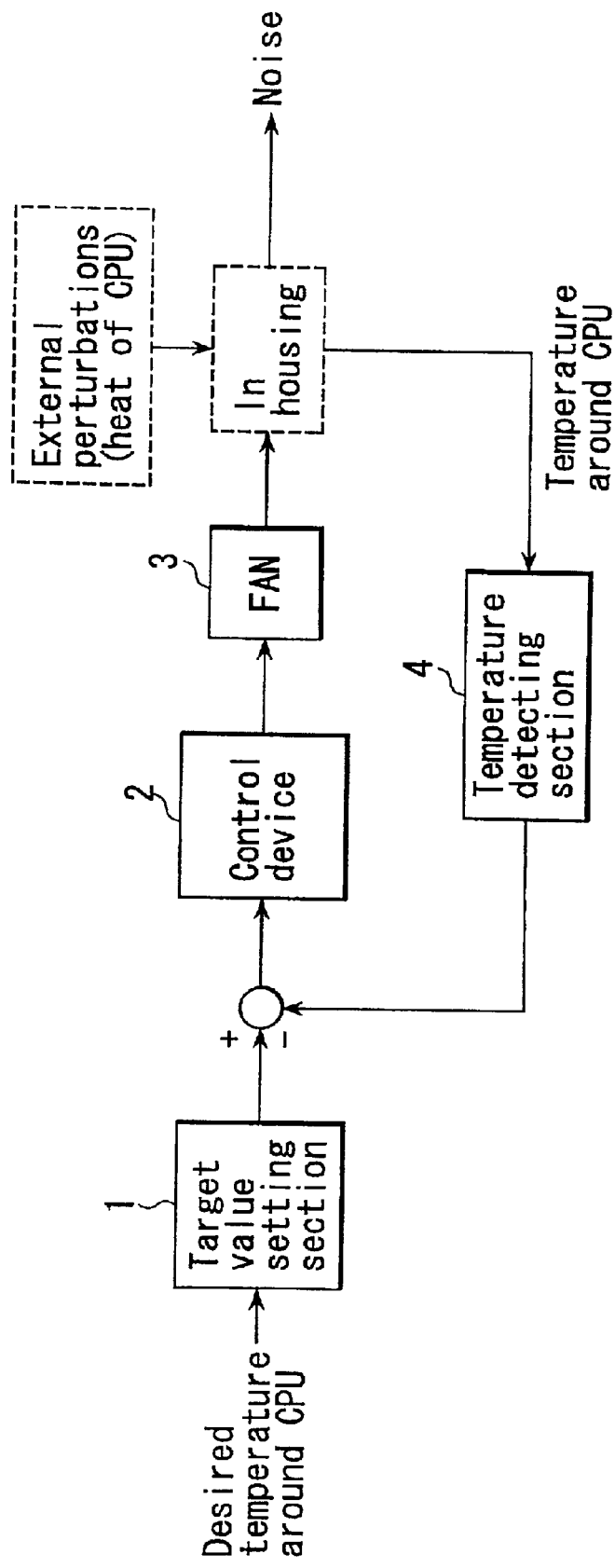
FIG. 4 is a block diagram showing a cooling device according to a second embodiment of the present invention.

FIG. 4 is a block diagram showing a cooling device according to a second embodiment of the present invention.

The cooling device of the second embodiment is also applicable to electronic apparatus, for example, a personal computer, which incorporates a CPU. Unlike in the first embodiment, the cooling device of the second embodiment has the same structure as that of the conventional art; that is, it includes a target value setting unit 1, a control device 2, a fan 3 and a temperature detecting unit 4. The second embodiment is characterized in that the cooling device with the conventional structure can prevent an abrupt rise and fall of a noise, which may acutely irritate the user, by means of the control device 2 as in cooling device of the first embodiment.

More specifically, when the temperature detected by the temperature detecting unit 4 exceeds the reference value, the control device 2 causes the fan 3 to rotate, as in the first embodiment. At this time, the rotation speed of the fan 3 is increased stepwise at predetermined intervals.

To the contrary, when the temperature detected by the temperature detecting unit 4 is lower than the reference value, the rotation speed of the fan 3 is decreased stepwise at predetermined intervals until the fan 3 is stopped.

Figure 5:
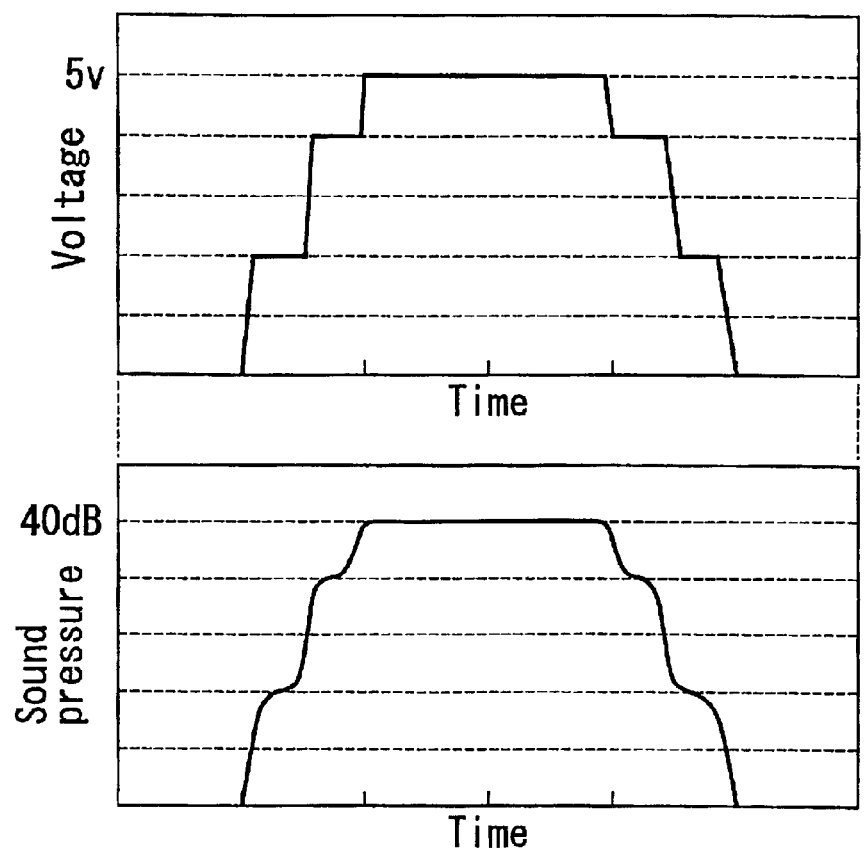
FIG. 5 is a diagram showing a change with time of a sound pressure of a noise generated by a cooling device according to the second embodiment.

FIG. 5 is a diagram showing a change with time of a sound pressure of a noise generated by the fan 3 of the cooling device of this embodiment. In FIG. 5, the upper graph shows a change in voltage supplied to the fan, and the lower graph shows a change in sound pressure of a noise generated by the fan 3.

As shown in FIG. 5, in the cooling device, when the fan 3 is started to rotate or stopped, the rotation speed is increased or decreased in, for example, three stages. Thus, in this embodiment, there is no abrupt rise or fall of a noise, which may acutely irritate the user. As a result, the noise generated by the cooling fan does not substantially discomfort the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cooling device of an electronic apparatus comprising:
    a temperature sensor;
    a cooling fan;
    a noise detecting unit configured to detect a sound pressure of a noise generated by the cooling fan; and
    a fan control unit configured to control a rotation speed of the cooling fan based on a detection result of the temperature sensor and a detection result of the noise detecting unit,
    wherein the noise detecting unit detects a change in the sound pressure per unit time, and
    wherein the fan control unit controls the rotation speed of the cooling fan such that the change in the sound pressure per unit time detected by the noise detecting unit does not exceed a predetermined reference value.

2. A cooling device of an electronic apparatus comprising:
    a cooling fan; and
    a fan control unit configured to control a rotation speed of the cooling fan such that the rotation speed is increased stepwise at predetermined intervals by stepwise increasing a voltage supplied to the cooling fan when the fan control unit causes the cooling fan to operate, and the rotation speed is decreased stepwise at predetermined intervals by stepwise decreasing a voltage supplied to the cooling fan when the control unit causes the cooling fan to stop.

* * * * *